(12) United States Patent
Speth et al.

(10) Patent No.: US 8,108,290 B2
(45) Date of Patent: Jan. 31, 2012

(54) MARKET SENTIMENT INDICATOR

(75) Inventors: William Speth, Evanston, IL (US); Steve Chodash, Buffalo Grove, IL (US)

(73) Assignee: Chicago Board Options Exchange, Incorporated, Chicago, IL (US)

(*) Notice: Subject to any disclaimer, the term of this patent is extended or adjusted under 35 U.S.C. 154(b) by 125 days.

(21) Appl. No.: 12/030,696

(22) Filed: Feb. 13, 2008

(65) Prior Publication Data

US 2008/0201249 A1  Aug. 21, 2008

Related U.S. Application Data

(60) Provisional application No. 60/890,093, filed on Feb. 15, 2007.

(51) Int. Cl.
*G06Q 40/00* (2006.01)
(52) U.S. Cl. .......................... 705/37; 705/28
(58) Field of Classification Search ................ 705/37
See application file for complete search history.

(56) References Cited

U.S. PATENT DOCUMENTS

| | | | | |
|---|---|---|---|---|
| 2005/0187854 | A1* | 8/2005 | Cutler et al. | 705/37 |
| 2006/0253367 | A1* | 11/2006 | O'Callahan et al. | 705/37 |
| 2006/0265303 | A1* | 11/2006 | Kemp et al. | 705/35 |

OTHER PUBLICATIONS

Getting Sentimental: Sentiment analysis gives advisers a valuable tool for understanding investor psychology and its impact on the stock market. By David Twibell Financial Planning Sep. 1, 2004.*
Bear market shift: New ranges for old indicators by Shust, Paul. Futures v31n14 pp. 48-50 Nov. 2002. ISSN:0746-2468.*
Information embedded in the trading volume of currency options. by Machnes, Yaffa. Derivatives Use, Trading & Regulation v12n3 pp. 244-249 Nov. 2006 ISSN: 1357-0927.*
"A Simple, Practical Use for ISE Select", Web printout from www.sentimentrader.com, dated Apr. 2, 2007 (2 pages).
Hulbert, Mark, "Contrarians Are Smiling", Web printout from www.marketwatch.com, dated Mar. 13, 2007 (3 pages).
Pendergraft, Rick, "Market Update: A Different View of the ISEE", Schaeffers Investment Research, dated Feb. 16, 2006 (2 pages).
Tan, Kopin, "ISEE on the Cake?", Reprinted from Barron's, dated Dec. 1, 2003 (1 page).

* cited by examiner

*Primary Examiner* — Ella Colbert
*Assistant Examiner* — John A Anderson
(74) *Attorney, Agent, or Firm* — Brinks Hofer Gilson & Lione

(57) ABSTRACT

A method and system for determining and displaying market sentiment information is disclosed. The method may include obtaining customer opening option activity information from an order routing system database, excluding spread transactions from the customer opening option activity information, calculating a sum of buy call trades and sell put trades from the customer opening option activity information, calculating a total number of customer trades from the customer opening option activity information and dividing the sum of buy call trades and sell put trades by the total number of customer trades to calculate an indicator value. The indicator value may be recalculated every N period until an end of a trading day using all trades through the N period in the trading day.

18 Claims, 3 Drawing Sheets

MARKET SENTIMENT INDICATOR

CROSS-REFERENCE TO RELATED APPLICATIONS

This application claims the benefit of U.S. Provisional Application No. 60/890,093, pending, filed Feb. 15, 2007, the entirety of which is incorporated by reference herein.

TECHNICAL FIELD

The present disclosure relates to derivative investment markets. More particularly, the present disclosure relates to methods of determining and displaying indicators of market sentiment in a system of trading securities or derivatives.

BACKGROUND

A derivative is a financial security whose value is derived in part from a value or characteristic of another security, known as an underlying asset. Two exemplary, well known derivatives are options and futures.

An option is a contract giving a holder of the option a right, but not an obligation, to buy or sell an underlying asset at a specific price on or before a certain date. Generally, a party who purchases an option is referred to as the holder of the option and a party who sells an option is referred to as the writer of the option.

There are generally two types of options: call options and put options. A holder of a call option receives a right to purchase an underlying asset at a specific price, known as the "strike price," such that if the holder exercises the call option, the writer is obligated to deliver the underlying asset to the holder at the strike price. Alternatively, the holder of a put option receives a right to sell an underlying asset at a specific price, referred to as the strike price, such that if the holder exercises the put option, the writer is obligated to purchase the underlying asset at the agreed upon strike price. Thus, the settlement process for an option involves the transfer of funds from the purchaser of the underlying asset to the seller, and the transfer of the underlying asset from the seller of the underlying asset to the purchaser. This type of settlement may be referred to as "in kind" settlement. However, an underlying asset of an option does not need to be tangible, transferable property.

Options may also be based on more abstract market indicators, such as stock indices, interest rates, futures contracts and other derivatives. In these cases, in kind settlement may not be desired, or in kind settlement may not be possible because delivering the underlying asset is not possible. Therefore, cash settlement is employed. Using cash settlement, a holder of an index call option receives the right to "purchase" not the index itself, but rather a cash amount equal to the value of the index multiplied by a multiplier such as $100. Thus, if a holder of an index call option elects to exercise the option, the writer of the option is obligated to pay the holder the difference between the current value of the index and the strike price multiplied by the multiplier. If the current value of the index is less than or equal to the strike price, the option is worthless due to the fact the holder would realize a loss.

With the development of electronic trading systems, it is critical to have the ability to make appropriate entry and exit decisions quickly to maximize profits while minimizing losses. This is particularly the case with options trading. In addition, when investors trade the live market without any trend indication relative to the stock or option being traded, they may not be trading with the market sentiment. As each option has a particular strike price and an expiration date, timing is critical in an investor's success. Lacking access to the proper investment instruments, an investor may spend precious time in an effort to calculate market sentiment in order to obtain an indication of same.

Therefore, there is a need for a method for determining an indicator of market sentiment and for displaying such an indicator to investors for use in formulating trading strategies.

BRIEF SUMMARY

In order to address the need for a method for determining and displaying an indicator of market sentiment, a method is disclosed herein that provides for the calculation of an indicator of market sentiment.

According to a first aspect, a method for determining market sentiment includes receiving option activity information from an order routing system, calculating a sum of buy call contract volume and sell put contract volume from the option activity information and calculating a total amount of contract volume from the option activity information. The method also includes generating an indicator value representing market sentiment based on the sum of buy call contract volume and sell put contract volume and based on the total amount of contract volume and displaying the indicator value on a display.

In another aspect, computer-readable medium is disclosed having processor executable instructions for determining an indicator of market sentiment, where the instructions are configured to cause a processor to calculate a sum of buy call contract volume and sell put contract volume from the option activity information and calculate a total amount of contract volume from the option activity information. The instructions are also configured to cause a processor to generate an indicator value representing market sentiment based on the sum of buy call contract volume and sell put contract volume and based on the total amount of contract volume and display the indicator value on a display.

In another aspect, a system for determining market sentiment at an exchange is disclosed. The system includes an interface adapted receive option activity information from an order routing system and a processor in communication with the interface. The processor is configured to calculate a sum of buy call contract volume and sell put contract volume from the option activity information, calculate a total amount of contract volume from the option activity information, generate an indicator value representing market sentiment based on the sum of buy call contract volume and sell put contract volume and based on the total amount of contract volume, and then transmit the indicator value for display.

In another aspect, a method for determining market sentiment includes receiving option activity information from an order routing system, calculating a sum of buy call activity and sell put activity from the option activity information, calculating a total amount of option activity from the option activity information and generating an indicator value representing market sentiment based on the sum of buy call activity and sell put activity and based on the total amount of option activity. The method further includes displaying the indicator value on a display. In one implementation, the buy call activity and sell put activity may be the sum of customer buy call trades and customer sell put trades, and the total amount of option activity may be a total number of customer trades, exclusive of all spread transactions and professional orders.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION

A method for determining and displaying an indicator of market sentiment is described herein. The indicator may be based upon customer opening option activity, excluding spread transactions. As detailed herein, indicator values are generated using either a number of customer trades or volume of customer trades. The indicator values may be calculated by product type, such as equity or index, and exchange total, such as the total on the Chicago Board Options Exchange.

Figure 1:
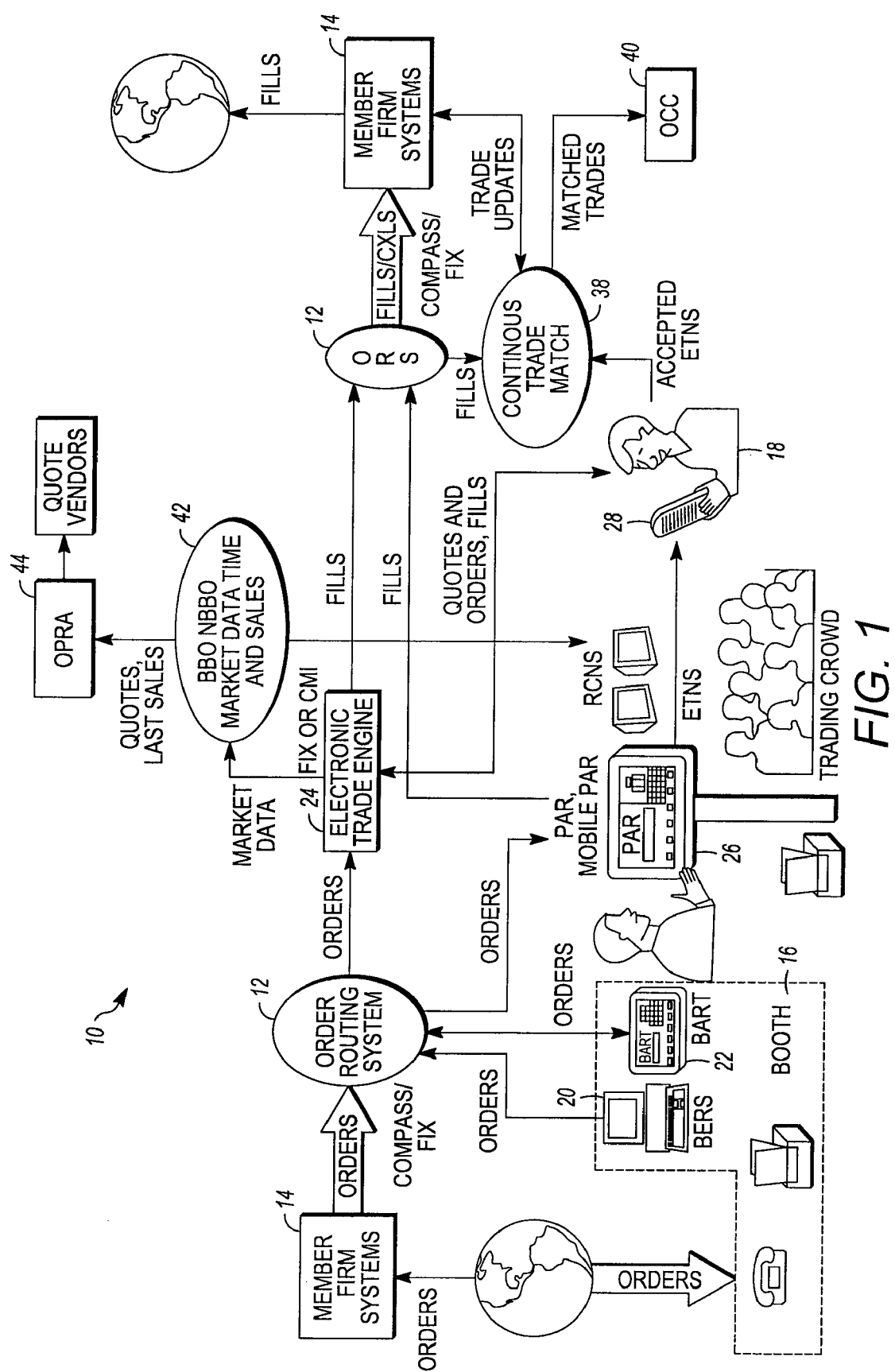
FIG. 1 is a diagram of a hybrid exchange system merging screen-based electronic orders with traditional open-outcry floor trading.

FIG. 1 illustrates an embodiment of a hybrid exchange system 10 combining aspects of electronic, screen-based trading with traditional, open-outcry trading that may be used implement various securities and derivatives trading methods described herein. The system 10 receives orders for the purchase or sale of securities, for example derivatives such as stock options, from numerous sources at a central order routing system (ORS) 12. ORS 12 may be any of a number of data processing systems or platforms capable of managing multiple transactions. In one embodiment, the order routing system can be implemented on a transaction processing facility (TPF) platform manufactured by IBM Corporation. For purposes of clarity, the examples herein will refer specifically to options. It should be understood that the system and methods disclosed herein might be applied to the trading of other types of securities and derivatives. An exchange utilizing the system and methods described herein may manage a number of classes of derivatives, where each of the plurality of classes of derivatives are associated with an underlying asset such as a stock, a bond, a note, a future, an exchange traded fund, an index, a commodity or other known asset types.

Orders may be entered into the ORS 12 from remote member firm systems 14, from member firm's booths 16 physically located at the exchange system 10 and from market makers 18 present on the trading floor of the exchange. The member firm systems 14 may be located remotely from the geographical location of the exchange and use any of a number of standard landline or wireless communication networks to direct orders electronically to the ORS 12. The member firm systems 14 communicate with one of several interfaces or protocols for transmitting their orders to the ORS 12. Examples of suitable interfaces are those using a distributed object interface based on the CORBA standard and available from the Object Management Group. Interfaces such as financial information exchange (FIX), which is a message-based protocol implemented over TCP/IP available from FIX Protocol, Ltd., or other known securities transaction communication protocols are also suitable protocols. In some instances, orders may even be made by telephone calls or facsimile transmissions directly to the booths 16 of member firms at the exchange. Orders submitted from a booth 16 at the exchange may come from a booth entry and routing system (BERS) 20 or a booth automated routing terminal (BART) 22.

The BERS 20 is a computer workstation that provides firm staff members at the booth with an entry template and a graphic user interface with a number of function buttons arranged on the display. Orders entered at the booth through BERS 20 typically consist of orders that were telephoned to the booth and orders that were wired to member firm-owned house printers in the booth. The orders entered through BERS are entered manually by booth staff using an order template and graphic user interface on the workstation. Generally, an order entered at BERS 20 will be routed to the ORS 12. Member firms, however, may specify that a particular order entered through BERS be routed to the BART 22 device. The BART 22 device, sometimes referred to as the "electronic runner," allows member firms to maintain more control over their order flow. BART 22 allows each firm to customize certain ORS 12 parameters to route a certain portion of their order flow to the firm booth.

As with the BERS 20, BART 22 may be implemented on a touch-screen workstation located in the member firm booth. The BART 22 operator at the booth may electronically forward orders to desired destinations. Potential destinations for these booth-routed orders are the ORS 12, the electronic trade engine 24 in communication with the ORS 12, or the public automated routing (PAR) system 26 used by the floor brokers at the exchange. The PAR system 26 may be implemented as a PC-based, touch-screen order routing and execution system accessible by floor brokers on the floor of the exchange. The PAR system 26 terminals allow a floor broker to select an order from the workstation and receive an electronic trading card on which the floor broker may enter trade information such as its volume, price, opposing market makers, etc. When a floor broker completes a card, the floor broker can then execute a trade electronically with the touch of a finger on the touch screen interface. The PAR system 26 then transmits the completed order, also referred to as a "fill," back to the ORS 12. The PAR 26 may be a fixed workstation or a mobile workstation in the form of a hand-held unit.

Market makers 18 on the floor of the exchange may enter quotes and orders via electronic devices, such as hand-held market maker terminals (MMT) 28. The MMT may be any of a number of electronic hand-held devices capable of communicating with the electronic trade engine 24 and ORS 12 through an application programming interface (API) such as FIX version 4.2 or CMi, an API available from Chicago Board Options Exchange, Incorporated of Chicago, Ill. An example of a suitable handheld device is the Fujitsu Stylistic 3500 available from Fujitsu Ltd. of Tokyo, Japan.

When a trade is completed, whether on the floor in open outcry and entered into PAR 26 or automatically executed through the electronic trade engine 24, the fill information is sent through the electronic trade engine 24 and ORS 12. ORS 12 passes the fill information to the member firm systems and to a continuous trade match (CTM) system 38 which matches the buy side and sell side of a trade which, in turn, forwards the matched trades to the Options Clearing Corporation (OCC) 40, a third party organization that will verify that all trades properly clear. The electronic trade engine 24 also sends quote and sale update information through an internal distribution system 42 that will refresh display screens within the exchange 10 and format the information for submission to a quote dissemination service such as the Options Price Reporting Authority (OPRA) 44.

The ORS 12 may use existing trade information to generate an indicator of market sentiment, as detailed herein below. The cumulative value will be calculated every time period 'N' based upon all of the eligible trades. For example, a value of 30 minutes for N may be used to calculate an indicator value using only the trades from the previous half hour of trading. As further discussed below, indicator values may also be calculated using volume statistics. Preferably, the indicator values are transmitted to a dissemination service such as OPRA 44. A report may also be generated that will display the indicator value and/or its components on a display screen or printout for the user. Although a trading system 10 with hybrid open-outcry and electronic aspects has been discussed, all electronic systems are also contemplated.

Figure 2:
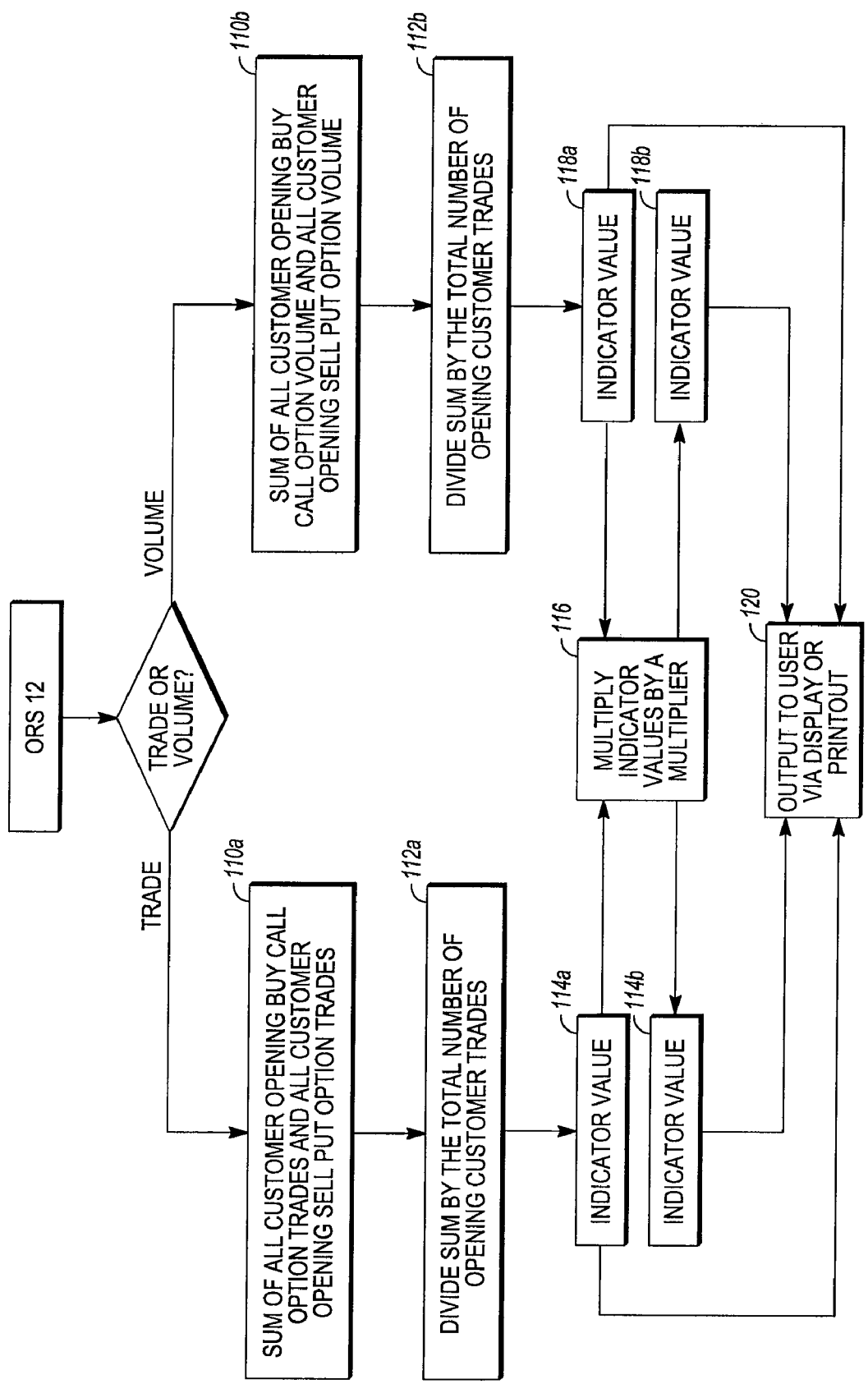
FIG. 2 is a flow-chart diagram of an embodiment of a method for determining an indicator of market sentiment.

Referring now to FIG. 2, one embodiment of a method for determining and displaying an indicator of market sentiment, such as bullish or bearish, described herein is illustrated.

Trade-Based Indicator

In accordance with FIG. 2, an indicator value 114a is calculated in the system 10 by taking the sum of all customer opening buy call option trades and all customer opening sell put option trades at step 110a, then dividing that number by the total number of opening customer trades at step 112a to calculate the indicator value 114a. Additionally, in an embodiment, the indicator value 114a is multiplied by a multiplier at step 116, such as multiplying the resulting indicator value 114a by a numerical value such as 100.

It is preferred that the indicator value 114a is calculated using trades from customer orders only. Trades from spread orders or other complex orders preferably not utilized in the calculation of the indicator value 114a. Thus, in an embodiment, taking the sum of Buy Call trades and Sell Put trades, then dividing by the total number of customer trades, yields the indicator value 114a. In another embodiment, the indicator value 114a is multiplied by a multiplier to generate an indicator value 114b, such as an indicator value 114b positioned within a range of numbers, for example between the numbers 0-100. The resulting indicator values 114a and b can then be characterized as indicative of market sentiment, such as bullish or bearish, based on predefined criteria, such as an indicator value of 0.0-0.49 (or 0-49) being bearish or an indicator value of 0.51-1.0 (or 51-100) being bullish.

Preferably, the indicator values 114a or 114b are calculated every period 'N' until the end of the trading day using all of the trades through that point in the day. The period 'N' may be numerical time value, such as, for example, every 30 minutes or every 60 seconds, or may be a numerical value indicative of a number of calculations in a given day, such as, for example, once-a-day or twice-a-day. In one example, the indicator value 114a, b is calculated every thirty minutes. Such an indicator value 114a, b may, for example, include only the trades from the previous time period (for example, thirty minutes). Additionally, the indicator value 114a, b may be calculated for equity trades, index trades, and total exchange trades.

Volume-Based Indicator

In a manner similar to that of the trade-based indicator detailed above, a volume-based indicator may be calculated. As further illustrated in FIG. 2, an indicator value 118a is calculated in the system 10 by taking the sum of all customer opening buy call option volume and all customer opening sell put option volume at step 110b, then dividing that number by the total number of opening customer volume at step 112b to calculate the indicator value 118a. Additionally, in an embodiment, the indicator value 118a is multiplied by a multiplier at step 116, such as multiplying the resulting indicator value 118a by a numerical value such as 100.

It is preferred that the indicator value 118a is calculated using the volume from customer orders only. Volume from spread orders or other complex orders preferably not utilized in the calculation of the indicator value 118a. Thus, in an embodiment, taking the sum of Buy Call volume and Sell Put volume, then dividing by the total number of customer volume, yields the indicator value 118a. In another embodiment, the indicator value 118a is multiplied by a multiplier to generate the indicator value 118b, such as an indicator value 118b positioned within a range of numbers, for example between the numbers 0-100. As stated previously with respect to indicator values 114a and b, the resulting indicator values 118a and b can also be characterized as indicative of market sentiment, such as bullish or bearish, based on predefined criteria, such as an indicator value of 0.0-0.49 (or 0-49) being bearish or an indicator value of 0.51-1.0 (or 51-100) being bullish.

Preferably, the indicator values 118a, b are also calculated every period 'N' until the end of the trading day using all of the volume through that point in the day. As stated previously with regard to indicator values 114a and b, the period 'N' may be numerical time value, such as, for example, every 30 minutes or every 60 seconds, or may be a numerical value indicative of a number of calculations in a given day, such as, for example, once-a-day or twice-a-day. In one example, the indicator value 118a, b is calculated every thirty minutes. Such an indicator value 118a, b may, for example, include only the trades from the previous time period (thirty minutes).

Additionally, the indicator value 118a, b may also be calculated for equity volume, index volume, and total exchange volume. Further, at step 120, the indicator value 114a, b and/or 118a, b may be output to a display or printer that will display the indicator value and/or its components on a display screen or printout for the user.

EXAMPLES OF MARKET SENTIMENT INDICATOR VALUES

Example 1

Indicator Values for Index Trades and Volume: Bullish

| Index Customer Opening Trades | | | |
|---|---|---|---|
| | Buy Calls | 10 trades | 250 Contracts |
| | Sell Calls | 20 trades | 200 Contracts |
| | Buy Puts | 10 trades | 50 Contracts |
| | Sell Puts | 50 trades | 1000 Contracts |
| | Total | 90 trades | 1500 Contracts |

The Index Indicator Value by Trades is:

$$[(BC_t + SP_t)/TT*M] = IV_t \text{ where:}$$

$BC_t$ is the number of Buy Call trades (10), $SP_t$ is the number of Sell Put trades (50), TT is the Total Trades (90), M is the multiplier value (100) and $IV_t$ is the Indicator Value by trades; and the Index Indicator Value by Volume is:

$$[(BC_v + SP_v)/TV*M] = IV_v \text{ where:}$$

$BC_v$ is the number of Buy Call volume (250), $SP_v$ is the number of Sell Put volume (1000), TV is the Total Volume (1500), M is the multiplier value (100) and $IV_v$ is the Indicator Value by volume.

Therefore:

$$[(10+50)/90]*100=66.67 \text{ and } [(250+1000)/1500]*100=83.33$$

Example 2

Indicator Values for Equity Trades and Volume: Bullish

| Equity Customer Opening Trades | Buy Calls | 500 trades | 12,500 Contracts |
|---|---|---|---|
| | Sell Calls | 100 trades | 2,000 Contracts |
| | Buy Puts | 200 trades | 3,000 Contracts |
| | Sell Puts | 250 trades | 7,000 Contracts |
| | Total | 1050 trades | 24,500 Contracts |

The Equity Indicator Value by Trades is:

$$[(BC_t+SP_t)/TT*M]=IV_t$$

where:
$BC_t$ is the number of Buy Call trades (500), $SP_t$ is the number of Sell Put trades (250), TT is the Total Trades (1050), M is the multiplier value (100) and $IV_t$ is the Indicator Value by trades; and
the Equity Indicator Value by Volume is:

$$[(BC_v+SP_v)/TV*M]=IV_v$$

where:
$BC_v$ is the number of Buy Call volume (12,750), $SP_v$ is the number of Sell Put volume (7,000), TV is the Total Volume (24,500), M is the multiplier value (100) and $IV_v$ is the Indicator Value by volume.
Therefore:

$$[(500+250)/1050]*100=71.43 \text{ and } [(12,500+7,000)/24,500]*100=79.59$$

Example 3

Bullish Indicator Values for Total Trades and Volume

| Total Customer Opening Trades | Buy Calls | 510 trades | 12,750 Contracts |
|---|---|---|---|
| | Sell Calls | 120 trades | 2,200 Contracts |
| | Buy Puts | 210 trades | 3,050 Contracts |
| | Sell Puts | 300 trades | 8,000 Contracts |
| | Total | 1140 trades | 26,000 Contracts |

The Total Indicator Value by Trades is:

$$[(BC_{to}+SP_{to})/TT*M]=IV_{to}$$

where:
$BC_{to}$ is the total number of Buy Call trades (510), $SP_{to}$ is the total number of Sell Put trades (300), TT is the Total Trades (1140), M is the multiplier value (100) and $IV_{to}$ is the Indicator Value by total trades; and
the Total Indicator Value by Volume is:

$$[(BC_{vo}+SP_{vo})/TV*M]=IV_{vo}$$

where:
$BC_{vo}$ is the total number of Buy Call volume (12,750), $SP_{vo}$ is the number of Sell Put volume (8,000), TV is the Total Volume (26,000), M is the multiplier value (100) and $IV_{vo}$ is the Indicator Value by total volume.
Therefore:

$$[(510+300)/1140]*100=71.05 \text{ and } [(12,750+8,000)/26,000]*100=79.81$$

Example 4

Indicator Values for Index Trades and Volume: Bearish

| Index Customer Opening Trades | Buy Calls | 10 trades | 250 Contracts |
|---|---|---|---|
| | Sell Calls | 20 trades | 1100 Contracts |
| | Buy Puts | 50 trades | 50 Contracts |
| | Sell Puts | 10 trades | 100 Contracts |
| | Total | 90 trades | 1500 Contracts |

The Index Indicator Value by Trades is:

$$[(BC_t+SP_t)/TT*M]=IV_t \text{ where:}$$

$BC_t$ is the number of Buy Call trades (10), $SP_t$ is the number of Sell Put trades (10), TT is the Total Trades (90), M is the multiplier value (100) and $IV_t$ is the Indicator Value by trades; and
the Index Indicator Value by Volume is:

$$[(BC_v+SP_v)/TV*M]=IV_v \text{ where:}$$

$BC_v$ is the number of Buy Call volume (250), $SP_v$ is the number of Sell Put volume (100), TV is the Total Volume (1500), M is the multiplier value (100) and $IV_v$ is the Indicator Value by volume.
Therefore:

$$[(10+10)/90]*100=22.22 \text{ and } [(250+100)/1500]*100=23.33$$

Example 5

Indicator Values for Equity Trades and Volume: Bearish

| Equity Customer Opening Trades | Buy Calls | 100 trades | 2,000 Contracts |
|---|---|---|---|
| | Sell Calls | 500 trades | 12,500 Contracts |
| | Buy Puts | 200 trades | 3,000 Contracts |
| | Sell Puts | 250 trades | 7,000 Contracts |
| | Total | 1050 trades | 24,500 Contracts |

The Equity Indicator Value by Trades is:

$$[(BC_t+SP_t)/TT*M]=IV_t$$

where:
$BC_t$ is the number of Buy Call trades (100), $SP_t$ is the number of Sell Put trades (250), TT is the Total Trades (1050), M is the multiplier value (100) and $IV_t$ is the Indicator Value by trades; and the Equity Indicator Value by Volume is:

$$[(BC_v+SP_v)/TV*M]=IV_v$$

where:
$BC_v$ is the number of Buy Call volume (2,000), $SP_v$ is the number of Sell Put volume (7,000), TV is the Total Volume (24,500), M is the multiplier value (100) and $IV_v$ is the Indicator Value by volume.

Therefore:

$$[(100+250)/1050]*100=33.33 \text{ and } [(2,000+7,000)/24,500]*100=36.73$$

Example 6

Indicator Values for Total Trades and Volume: Bearish

| Total Customer Opening Trades | Buy Calls | 110 trades | 2,250 Contracts |
|---|---|---|---|
| | Sell Calls | 520 trades | 13,600 Contracts |
| | Buy Puts | 250 trades | 3,050 Contracts |
| | Sell Puts | 260 trades | 7,100 Contracts |
| | Total | 1140 trades | 26,000 Contracts |

The Total Indicator Value by Trades is:

$$[(BC_{to}+SP_{to})/TT*M]=IV_{to}$$

where:
$BC_{to}$ is the total number of Buy Call trades (110), $SP_{to}$ is the total number of Sell Put trades (250), TT is the Total Trades (1140), M is the multiplier value (100) and $IV_{to}$ is the Indicator Value by total trades; and the Total Indicator Value by Volume is:

$$[(BC_{vo}+SP_{vo})/TV*M]=IV_{vo}$$

where:
$BC_{vo}$ is the total number of Buy Call volume (2,250), $SP_{vo}$ is the number of Sell Put volume (7,100), TV is the Total Volume (26,000), M is the multiplier value (100) and $IV_{vo}$ is the Indicator Value by total volume.

Therefore:

$$[(110+250)/1140]*100=31.58 \text{ and } [(2,250+7,100)/26,000]*100=35.96$$

As has been described above, the methods described herein are utilized for determining and displaying an indicator of market sentiment.

Figure 3:
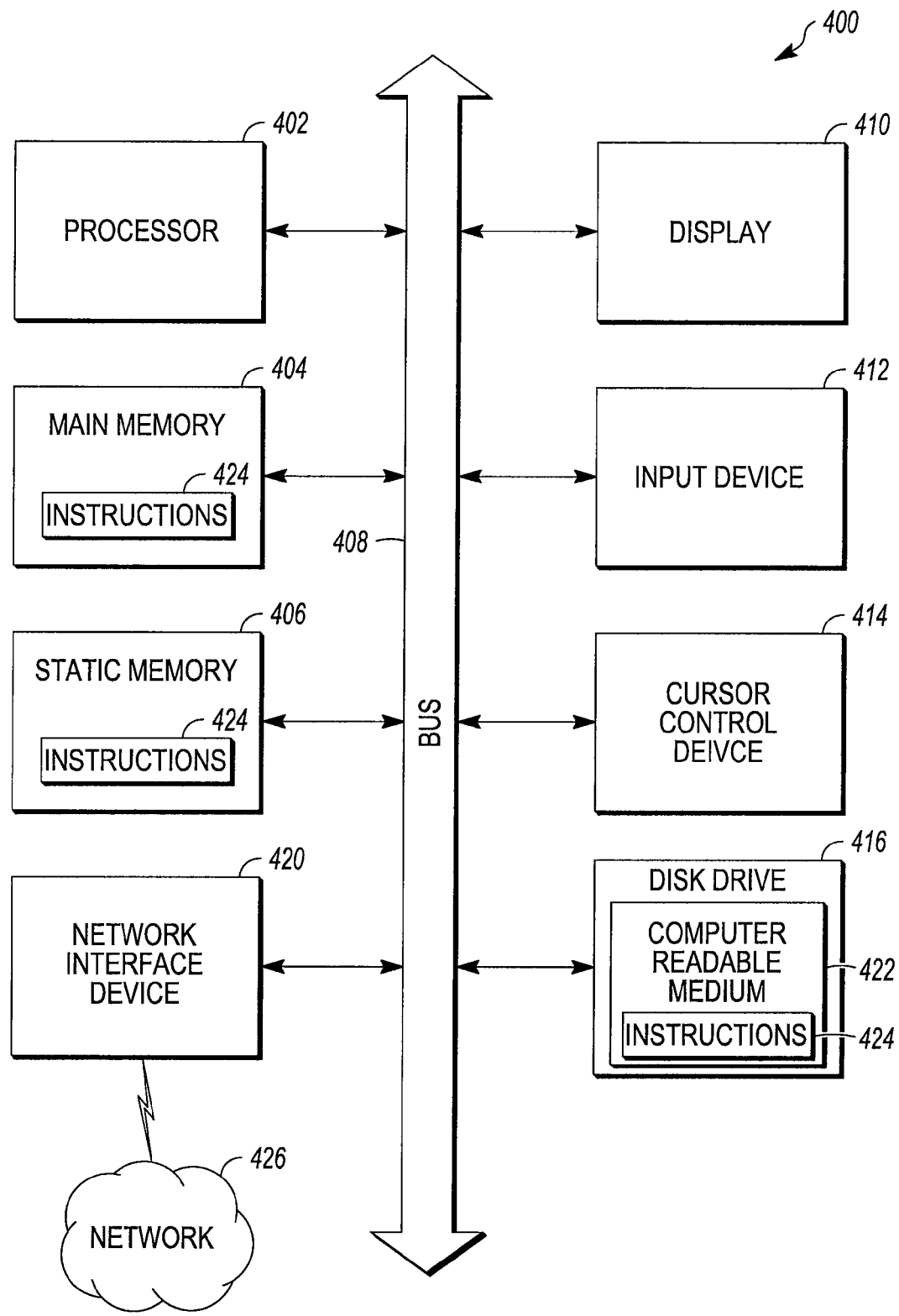
FIG. 3 is a block diagram of a general computing device and network connectivity.

Referring now to FIG. 3, an illustrative embodiment of a general computer system that may be used for one or more of the steps shown in FIG. 2, or in any other trading system configured to carry out the methods discussed above, is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 3, the computer system 400 may include a processor 402, e.g., a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416 and a network interface device 420.

In a particular embodiment, as depicted in FIG. 3, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile rewritable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols commonly used on financial exchanges, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Although the methods described herein preferably relate to a hybrid system incorporating and involving active participation from a trading floor and a screen-based electronic trading crowd, the procedures described may be applied to an exclusively electronic, screen-based exchange that does not include floor based, open-outcry trading. As will be appreciated by those of ordinary skill in the art, mechanisms for determining and displaying an indicator of market sentiment and other features described above may all be modified for application to electronic-only trading within the purview and scope of the present invention.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. It is therefore intended that the foregoing detailed description be regarded as illustrative rather than limiting, and that it be understood that it is the following claims, including all equivalents, that are intended to define the scope of this invention.

What is claimed is:

1. A computer-readable medium comprising processor executable instructions for determining an indicator of market sentiment, the instructions configured to cause a processor to:

receive option activity information from an order routing system;

calculate a sum of buy call contract volume and sell put contract volume from the option activity information;

calculate a total amount of contract volume from the option activity information;

generate an indicator value representing market sentiment based on the sum of buy call contract volume and sell put contract volume and based on the total amount of contract volume; and display the indicator value on a display.

2. The computer readable medium according to claim 1, wherein the option activity information comprises customer option activity information and further comprising instructions to exclude spread transactions and professional orders when calculating the sum of the buy call contract volume and sell put contract volume, and the total amount of contract volume.

3. The computer readable medium according to claim 1, wherein the option activity information comprises option activity for an opening period and wherein the instructions to display the indicator value comprise instructions to display the indicator value for the opening period.

4. The computer readable medium according to claim 1, wherein the instructions to generate the indicator comprise instructions to divide the sum of buy call contract volume and sell put contract volume by the total amount of contract volume.

5. The computer readable medium according to claim 1, wherein the instructions to generate the indicator value comprise instructions to generate the indicator value periodically during a trading day, wherein the indicator value at a particular time is based on cumulative option activity information through the particular time.

6. The computer readable medium according to claim 1, wherein the instructions to generate the indicator value comprise instructions to generate a periodic indicator value at an end of each of a plurality of time periods during a trading day, wherein the periodic indicator value for a particular time period of the plurality of time periods is based only on option activity information during the particular time period.

7. The computer readable medium according to claim 1, further comprising instructions to multiply the indicator value by a multiplier.

8. A system for determining market sentiment at an exchange, the system comprising:

an interface adapted receive option activity information from an order routing system; and a processor in communication with the interface, the processor configured to:

calculate a sum of buy call contract volume and sell put contract volume from the option activity information;

calculate a total amount of contract volume from the option activity information;

generate an indicator value representing market sentiment based on the sum of buy call contract volume and sell put contract volume and based on the total amount of contract volume; and transmit the indicator value for display.

9. The system according to claim 8, wherein the option activity information comprises customer option activity information and the processor is further configured to exclude spread transactions and professional orders when calculating the sum of the buy call contract volume and sell put contract volume, and the total amount of contract volume.

10. The system according to claim 8, wherein the option activity information comprises option activity for an opening period and wherein the processor is configured to display the indicator value for the opening period.

11. The system according to claim 8, wherein the processor is configured to generate the indicator by dividing the sum of buy call contract volume and sell put contract volume by the total amount of contract volume.

12. The system according to claim 8, wherein the processor is further configured to generate the indicator value periodically during a trading day, wherein the indicator value at a particular time is based on cumulative option activity information through the particular time.

13. The system according to claim 8, wherein the processor is further configured to generate a periodic indicator value at an end of each of a plurality of time periods during a trading day, wherein the periodic indicator value for a particular time period of the plurality of time periods is based only on option activity information during the particular time period.

14. The system according to claim 8, wherein the processor is further configured to multiply the indicator value by a multiplier.

15. A method for determining market sentiment comprising the steps of:
  receiving option activity information from an order routing system;
  calculating a sum of buy call activity and sell put activity from the option activity information;
  calculating a total amount of option activity from the option activity information;
  generating an indicator value representing market sentiment based on the sum of buy call activity and sell put activity and based on the total amount of option activity; and
  displaying the indicator value on a display.

16. The method of claim 15 wherein the sum of buy call activity and sell put activity comprises the sum of customer buy call trades and customer sell put trades, and wherein the total amount of option activity comprises a total number of customer trade, exclusive of all spread transactions and professional orders.

17. The method of claim 16, wherein generating the indicator value comprises dividing the sum of customer buy call trades and customer sell put trades by the total number of customer trades.

18. The method of claim 17, further comprising recalculating the indicator value every N period until an end of a trading day using all trades through the N period in the trading day.

* * * * *

UNITED STATES PATENT AND TRADEMARK OFFICE
CERTIFICATE OF CORRECTION

PATENT NO. : 8,108,290 B2
APPLICATION NO. : 12/030696
DATED : January 31, 2012
INVENTOR(S) : William Speth et al.

It is certified that error appears in the above-identified patent and that said Letters Patent is hereby corrected as shown below:

In the Claims

In column 14, claim 16, line 14, before "exclusive of all spread" replace "trade," with --trades,--.

Signed and Sealed this
Seventeenth Day of April, 2012

David J. Kappos
*Director of the United States Patent and Trademark Office*